United States Patent
Xu et al.

(10) Patent No.: US 7,257,837 B2
(45) Date of Patent: Aug. 14, 2007

(54) FIREWALL PENETRATION SYSTEM AND METHOD FOR REAL TIME MEDIA COMMUNICATIONS

(75) Inventors: Chen Xu, Santa Clara, CA (US);
Huang-Ming Pan, Antioch, CA (US);
Shih-An Cheng, Fremont, CA (US);
Jing-Yao Huang, Fremont, CA (US)

(73) Assignee: Innomedia Pte, Singapore (SG)

( * ) Notice: Subject to any disclaimer, the term of this patent is extended or adjusted under 35 U.S.C. 154(b) by 838 days.

(21) Appl. No.: 10/627,594

(22) Filed: Jul. 26, 2003

(65) Prior Publication Data
US 2005/0033985 A1    Feb. 10, 2005

(51) Int. Cl.
*H04L 29/00* (2006.01)
*G06F 7/04* (2006.01)

(52) U.S. Cl. ......................................... 726/12; 713/153
(58) Field of Classification Search .................. 726/12, 726/14, 15
See application file for complete search history.

(56) References Cited

U.S. PATENT DOCUMENTS

2002/0114333 A1* 8/2002 Xu et al. .................... 370/392
2004/0034793 A1* 2/2004 Yuan ........................... 713/200
2004/0128554 A1* 7/2004 Maher et al. ................ 713/201
2004/0255156 A1* 12/2004 Chan et al. .................. 713/201

* cited by examiner

Primary Examiner—Matthew B Smithers
(74) Attorney, Agent, or Firm—Timothy P. O Hagan

(57) ABSTRACT

A system for initiating and maintaining a real time audio or video media session between two clients, at least one of which has a private network IP address and is supported by a NAT firewall, comprises a proxy server serving each client and a relay server. The first proxy server may receive an invite message from a caller client to initiate a media session with a callee client. The invite message will identify the IP address and media port number of the caller client. The proxy server queries the relay server to obtain a port number of the relay server that may be used for relaying the media session between the caller client and the callee client. The proxy server will replace the IP address and port number of the caller client with the IP address and port number of the relay server in the invite message before forwarding to the callee client. When the callee client generates a response message that includes the IP address and media port number of the callee client, the proxy server will replace the IP address and media port number of the callee client in the response message before forwarding the response message to the caller client.

14 Claims, 19 Drawing Sheets

| Forwarding Invite Message 192 | | |
|---|---|---|
| | Session ID 158 | : Unique Session ID Number |
| Invite 160 | ID 162 | : Callee ID |
| | Address 164 | : Redirect Address |
| | Port 166 | : Redirect Port |
| Via 168a | Type 170 | : Signal Format Type |
| | Address 172 | : Proxy 1 IP Address |
| | Port 174 | : Proxy 1 Signaling Port |
| Via 168 | Type 170 | : Signal Format Type |
| | Address 172 | : Extracted IP Address |
| | Port 174 | : Extracted Port |
| Contact 176 | ID 178 | : Client ID |
| | Address 180 | : Extracted IP Address |
| | Port 182 | : Extracted Port |
| Record Route 177 | : Proxy Information | |
| | Other SIP Fields | |
| SDP Payload 184 | Relay Server IP Address 208 | |
| | Relay Server Audio Port 209 | |
| | Relay Server Video Port 210 | |

Figure 5b

| Session Invite 156 | | |
|---|---|---|
| | Session ID 158 | : Unique Session ID Number |
| Invite 160 | ID 162 | : Callee ID |
| | Address 164 | : Proxy 1 IP Address |
| | Port 166 | : Proxy 1 Signaling Port |
| Via 168 | Type 170 | : Signal Format Type |
| | Address 172 | : Client IP Address |
| | Port 174 | : Client Signaling Port |
| Contact 176 | Type 178 | : Client ID |
| | Address 180 | : Client IP Address |
| | Port 182 | : Client Signaling Port |
| | Other SIP Fields | |
| SDP Payload 184 | Client IP Address 186 | |
| | Client Audio Port 188 | |
| | Client Video Port 190 | |

Figure 5a

| Second Forwarding Invite Message 194 |||
|---|---|---|
| Session ID 158 : Unique Session ID Number |||
| Invite 160 | ID 162 | : Callee ID |
| | Address 164 | : Callee IP Address |
| | Port 166 | : Callee Signaling Port |
| Via 168b | Type 170 | : Signal Format Type |
| | Address 172 | : Proxy 2 IP Address |
| | Port 174 | : Proxy 2 Signaling Port |
| Via 168a | Type 170 | : Signal Format Type |
| | Address 172 | : Proxy 1 IP Address |
| | Port 174 | : Proxy 1 Signaling Port |
| Via 168 | Type 170 | : Signal Format Type |
| | Address 172 | : Extracted IP Address |
| | Port 174 | : Extracted Port |
| Contact 176 | ID 178 | : Client ID |
| | Address 180 | : Extracted IP Address |
| | Port 182 | : Extracted Port |
| Record Route 177 : Proxy Information |||
| Other SIP Fields |||
| SDP Payload 184 | Relay Server IP Address 208 ||
| | Relay Server Audio Port 209 ||
| | Relay Server Video Port 210 ||

Figure 5c

| Session Invite 236 | | |
|---|---|---|
| | Session ID 158 | : Unique Session ID Number |
| Invite 160 | ID 162 | : Client 1 ID |
| Via 168 | Address 164 | : Proxy 2 IP Address |
| | Port 166 | : Proxy 2 Signaling Port |
| | Type 170 | : Signal Format Type |
| | Address 172 | : Client 3 IP Address |
| | Port 174 | : Client 3 Signaling Port |
| Contact 176 | Type 178 | : Client 3 ID |
| | Address 180 | : Client 3 IP Address |
| | Port 182 | : Client 3 Signaling Port |
| | Other SIP Fields | |
| SDP Payload 184 | Client 3 IP Address 238 | |
| | Client 3 Audio Port 240 | |
| | Client 3 Video Port 242 | |

Figure 5d

| Forwarding Invite Message 246 | | |
|---|---|---|
| | Session ID 158 | : Unique Session ID Number |
| Invite 160 | ID 162 | : Client 1 ID |
| | Address 164 | : Redirect Address (Proxy 1) |
| | Port 166 | : Redirect Port (Proxy 1) |
| Via 168a | Type 170 | : Signal Format Type |
| | Address 172 | : Proxy 2 IP Address |
| | Port 174 | : Proxy 2 Signaling Port |
| Via 168 | Type 170 | : Signal Format Type |
| | Address 172 | : Client 3 IP Address |
| | Port 174 | : Client 3 Port |
| Contact 176 | ID 178 | : Client ID |
| | Address 180 | : Client 3 IP Address |
| | Port 182 | : Client 3 Port |
| Record Route 177 | : Proxy Information | |
| | Other SIP Fields | |
| SDP Payload 184 | Client 3 IP Address 238 | |
| | Client 3 Audio Port 240 | |
| | Client 3 Video Port 242 | |

Figure 5e

| Second Forwarding Invite Message 248 | | |
|---|---|---|
| Session ID 158 : Unique Session ID Number | | |
| Invite 160 | ID 162 | : Client 1 ID |
| | Address 164 | : Redirect Address (NAT 1) |
| | Port 166 | : Redirect Port (NAT 1) |
| Via 168b | Type 170 | : Signal Format Type |
| | Address 172 | : Proxy 1 IP Address |
| | Port 174 | : Proxy 1 Signaling Port |
| Via 168a | Type 170 | : Signal Format Type |
| | Address 172 | : Proxy 2 IP Address |
| | Port 174 | : Proxy 2 Signaling Port |
| Via 168 | Type 170 | : Signal Format Type |
| | Address 172 | : Client 3 IP Address |
| | Port 174 | : Client 3 Port |
| Contact 176 | ID 178 | : Client ID |
| | Address 180 | : Client 3 IP Address |
| | Port 182 | : Client 3 Port |
| Record Route 177 : Proxy Information | | |
| Other SIP Fields | | |
| SDP Payload 184 | Relay Server IP Address 208 | |
| | Relay Server Audio Port 209 | |
| | Relay Server Video Port 210 | |

Figure 5f

| Second Forwarding Invite Message 254 | | |
|---|---|---|
| Session ID 158 | | : Unique Session ID Number |
| Invite 160 | ID 162 | : Client 1 ID |
| | Address 164 | : Redirect Address (NAT 2) |
| | Port 166 | : Redirect Port (NAT 2) |
| Via 168b | Type 170 | : Signal Format Type |
| | Address 172 | : Proxy 2 IP Address |
| | Port 174 | : Proxy 2 Signaling Port |
| Via 168a | Type 170 | : Signal Format Type |
| | Address 172 | : Proxy 1 IP Address |
| | Port 174 | : Proxy 1 Signaling Port |
| Via 168 | Type 170 | : Signal Format Type |
| | Address 172 | : Client 3 IP Address |
| | Port 174 | : Client 3 Port |
| Contact 176 | ID 178 | : Client ID |
| | Address 180 | : Client 3 IP Address |
| | Port 182 | : Client 3 Port |
| Record Route 177 | | : Proxy Information |
| Other SIP Fields | | |
| SDP Payload 184 | Relay Server IP Address 208 | |
| | Relay Server Audio Port 209 | |
| | Relay Server Video Port 210 | |

Figure 5g

| OK Response 230 | | |
|---|---|---|
| Session ID 158 : Unique Session ID Number | | |
| Via 168b | Type 170 | : Signal Format Type |
| | Address 172 | : Proxy 2 IP Address |
| | Port 174 | : Proxy 2 Signaling Port |
| Via 168a | Type 170 | : Signal Format Type |
| | Address 172 | : Proxy 1 IP Address |
| | Port 174 | : Proxy 1 Signaling Port |
| Via 168 | Type 170 | : Signal Format Type |
| | Address 172 | : Extracted IP Address |
| | Port 174 | : Extracted Port |
| Record Route 177 : Proxy Information | | |
| Other SIP Fields | | |
| SDP Payload 184 | Client IP Address 186 | |
| | Client Audio Port 188 | |
| | Client Video Port 190 | |

Figure 6a

| OK Response 230 | | |
|---|---|---|
| Session ID 158 : Unique Session ID Number | | |
| Via 168a | Type 170 | : Signal Format Type |
| | Address 172 | : Proxy 1 IP Address |
| | Port 174 | : Proxy 1 Signaling Port |
| Via 168 | Type 170 | : Signal Format Type |
| | Address 172 | : Extracted IP Address |
| | Port 174 | : Extracted Port |
| Record Route 177 : Proxy Information | | |
| Other SIP Fields | | |
| SDP Payload 184 | Client IP Address 186 | |
| | Client Audio Port 188 | |
| | Client Video Port 190 | |

Figure 6b

| OK Response 230 | | |
|---|---|---|
| Session ID 158 : Unique Session ID Number | | |
| Via 168 | Type 170 | : Signal Format Type |
| | Address 172 | : Extracted IP Address |
| | Port 174 | : Extracted Port |
| Record Route 177 : Proxy Information | | |
| Other SIP Fields | | |
| SDP Payload 184 | Relay Server IP Address 208 | |
| | Relay Server Audio Port 209 | |
| | Relay Server Video Port 210 | |

Figure 6c

| Forwarding OK Response 252 | | |
|---|---|---|
| Session ID 158 | : Unique Session ID Number | |
| Via 168a | Type 170 | : Signal Format Type |
| | Address 172 | : Proxy 2 IP Address |
| | Port 174 | : Proxy 2 Signaling Port |
| Via 168 | Type 170 | : Signal Format Type |
| | Address 172 | : Client 3 IP Address |
| | Port 174 | : Client 3 Port |
| Record Route 177 | : Proxy Information | |
| Other SIP Fields | | |
| SDP Payload 184 | Relay Server IP Address 208 | |
| | Relay Server Audio Port 209 | |
| | Relay Server Video Port 210 | |

Figure 6e

| OK Response 250 | | |
|---|---|---|
| Session ID 158 | : Unique Session ID Number | |
| Via 168b | Type 170 | : Signal Format Type |
| | Address 172 | : Proxy 1 IP Address |
| | Port 174 | : Proxy 1 Signaling Port |
| Via 168a | Type 170 | : Signal Format Type |
| | Address 172 | : Proxy 2 IP Address |
| | Port 174 | : Proxy 2 Signaling Port |
| Via 168 | Type 170 | : Signal Format Type |
| | Address 172 | : Client 3 IP Address |
| | Port 174 | : Client 3 Port |
| Record Route 177 | : Proxy Information | |
| Other SIP Fields | | |
| SDP Payload 184 | Client IP Address 186 | |
| | Client Audio Port 188 | |
| | Client Video Port 190 | |

Figure 6d

| OK Response 256 |||
|---|---|---|
| Session ID 158 : Unique Session ID Number |||
| Via 168b | Type 170 | : Signal Format Type |
| | Address 172 | : Proxy 2 IP Address |
| | Port 174 | : Proxy 2 Signaling Port |
| Via 168a | Type 170 | : Signal Format Type |
| | Address 172 | : Proxy 1 IP Address |
| | Port 174 | : Proxy 1 Signaling Port |
| Via 168 | Type 170 | : Signal Format Type |
| | Address 172 | : Extracted IP Address |
| | Port 174 | : Extracted Signaling Port |
| Record Route 177 : Proxy Information |||
| Other SIP Fields |||
| SDP Payload 184 | Client IP Address 186 ||
| | Client Audio Port 188 ||
| | Client Video Port 190 ||

Figure 6f

| Relay Server Invite 202 | | |
|---|---|---|
| Session ID 158 : Unique Session ID Number | | |
| Invite 160 | ID 162 | : Callee ID |
| | Address 164 | : RS IP Address |
| | Port 166 | : RS Signaling Port |
| Via 168 | Type 170 | : Signal Format Type |
| | Address 172 | : Proxy 1 IP Address |
| | Port 174 | : Proxy 1 Signaling Port |
| Record Route 177 : Proxy Information | | |
| Other SIP Fields | | |
| SDP Payload 184 | | |

Figure 8a

| Relay Server Response 204 | |
|---|---|
| Session ID 158 : Unique Session ID Number | |
| Other SIP Fields | |
| SDP Payload 184 | Relay Server IP Address 208 |
| | Relay Server Audio Port 209 |
| | Relay Server Video Port 210 |

Figure 8b

FIREWALL PENETRATION SYSTEM AND METHOD FOR REAL TIME MEDIA COMMUNICATIONS

TECHNICAL FIELD

The present invention relates to real time media communications in a packet switched data network and, more specifically, to establishing and maintaining real time media communication channels through a firewall.

BACKGROUND OF THE INVENTION

For many years voice telephone service was implemented over a circuit switched network commonly known as the public switched telephone network (PSTN) and controlled by a local telephone service provider. In such systems, the analog electrical signals representing the conversation are transmitted between the two telephone handsets on a dedicated twisted-pair-copper-wire circuit. More specifically, each telephone handset is coupled to a local switching station on a dedicated pair of copper wires known as a subscriber loop. When a telephone call is placed, the circuit is completed by dynamically coupling each subscriber loop to a dedicated pair of copper wires between the two switching stations.

More recently, the copper wires, or trunk lines between switching stations have been replaced with fiber optic cables. A computing device digitizes the analog signals and formats the digitized data into frames such that multiple conversations can be transmitted simultaneously on the same fiber. At the receiving end, a computing device reforms the analog signals for transmission on copper wires. Twisted pair copper wires of the subscriber loop are still used to couple the telephone handset to the local switching station.

More recently yet, voice telephone service has been implemented over the Internet. Advances in the speed of Internet data transmissions and Internet bandwidth have made it possible for telephone conversations to be communicated using the Internet's packet switched architecture and the TCP/IP and UDP/IP protocols.

To promote the wide spread use of Internet telephony, the International Telecommunication Union (ITU) had developed the H.323 set of standards and the Internet Engineering Task Force (IETF) has developed the Session Initiation Protocol (SIP) and the Multi-Media Gateway Control Protocol (MGCP).

A problem associated with internet telephony is that network address translation (NAT) firewalls prevent the transmission of UDP/IP frames from an endpoint computer outside the firewall to an endpoint computer on a private network inside the firewall.

More specifically, each endpoint designates a UDP/IP channel, which comprises the endpoint's IP address and an assigned UDP/IP port number, for receipt of real time media. The channel is then provided to the other endpoint.

Because the private network client does not have a globally unique IP address, a frame sent to such non-globally unique IP address can not be routed on the Internet and will be lost. Further, even if the private network client were able to identify and designate the IP address of the NAT firewall, the private network client has no means for establishing a port on the NAT firewall for receipt of real time media.

Because of the wide spread use of NAT firewalls which typically provide both IP address translation and port translation of all frames sent from the private network to the Internet, what is needed is a system and method for establishing and maintaining real time audio and/or a real time video communication session between two clients, at least one of which is located on a private network behind a NAT firewall.

SUMMARY OF THE INVENTION

A first aspect of the present invention is to provide a system for initiating and maintaining a real time audio or video media session between two clients, at least one of which has a private network IP address and is supported by a NAT firewall. The second of the two clients may, but need not, have a globally routable IP address.

In an exemplary embodiment, signaling begins with a caller client with a private network address signaling a session by sending an invite message identifying a callee client to a first proxy server. In this exemplary example, the callee client also has a private network IP address. The session invite message may be a SIP INVITE message that includes various SIP headers.

A session ID header labels a unique session ID number generated by the first client. An invite header identifies the called client, which in this exemplary example is a callee client with a globally routable IP address.

A single via header and a contact header of the session invite message both identify the caller client. In addition to such headers, the session invite message will also include session description protocol (SDP) payload which identifies the IP address and an audio media port number or a video media port number used by the caller client for real time protocol audio or video media sessions.

It should be appreciated that because the caller client is behind a firewall, the IP address of the caller client will be a private network address that is un-routable on the internet.

After the first proxy server receives the session invite message, it determines that the caller client has a private network IP address and therefore, requests a resource from a relay server. The process of requesting a resource includes sending a relay server invite message to the relay server and receiving a relay server response message back from the relay server.

The relay server response message identifies the IP address of the relay server as well as a port for relaying of the audio or video media. The proxy server replaces the caller client information in the SDP payload with the IP address and port number provided by the relay server.

Because the proxy server must forward each invite message to either the callee client or to a second proxy server serving the callee client, it queries a redirect server obtain a redirect address. The invite message, with the modified SDP payload is then forwarded to the redirect address.

In this exemplary example, because the callee client has a private network address and is behind a firewall, the redirect address identifies a second proxy server that supports the callee client and maintains a signaling channel to the callee client through the firewall.

The second proxy server must forward the invite message to the callee client. To determine the channel to the callee client through the firewall, the second proxy server queries the redirect server. The response form the redirect server will include the firewall IP address and a firewall port number that may be used to signal the callee client. The invite message is then sent to such firewall address and port number.

After the callee client receives the invite message, it may return various messages such as a SIP trying message and a SIP ringing message. When the callee client is ready to begin a media session, it will return an OK response message back to the second proxy server.

The OK response message will include various SIP headers and SDP payload that identifies the private network IP address of the callee client as well as a port number for audio or video media.

The second proxy server forwards the OK response message back to the first proxy server. The first proxy server replaces the IP address and port number of the callee client in the SDP payload with the IP address and port number of the relay server in the OK response message and then returns the OK response message back to the caller client.

For a better understanding of the present invention, together with other and further aspects thereof, reference is made to the following description, taken in conjunction with the accompanying drawings, and its scope will be pointed out in the appended clams.

BRIEF DESCRIPTION OF THE DRAWINGS

FIG. 5a though 5g represent exemplary invite messages in accordance with the present invention;

FIGS. 6a through 6f represent exemplary response messages in accordance with the present invention;

FIG. 8a represents an exemplary relay server invite message in accordance with the present invention;

FIG. 8b represents an exemplary relay server response message in accordance with the present invention;

DETAILED DESCRIPTION OF THE EXEMPLARY EMBODIMENTS

Figure 1:
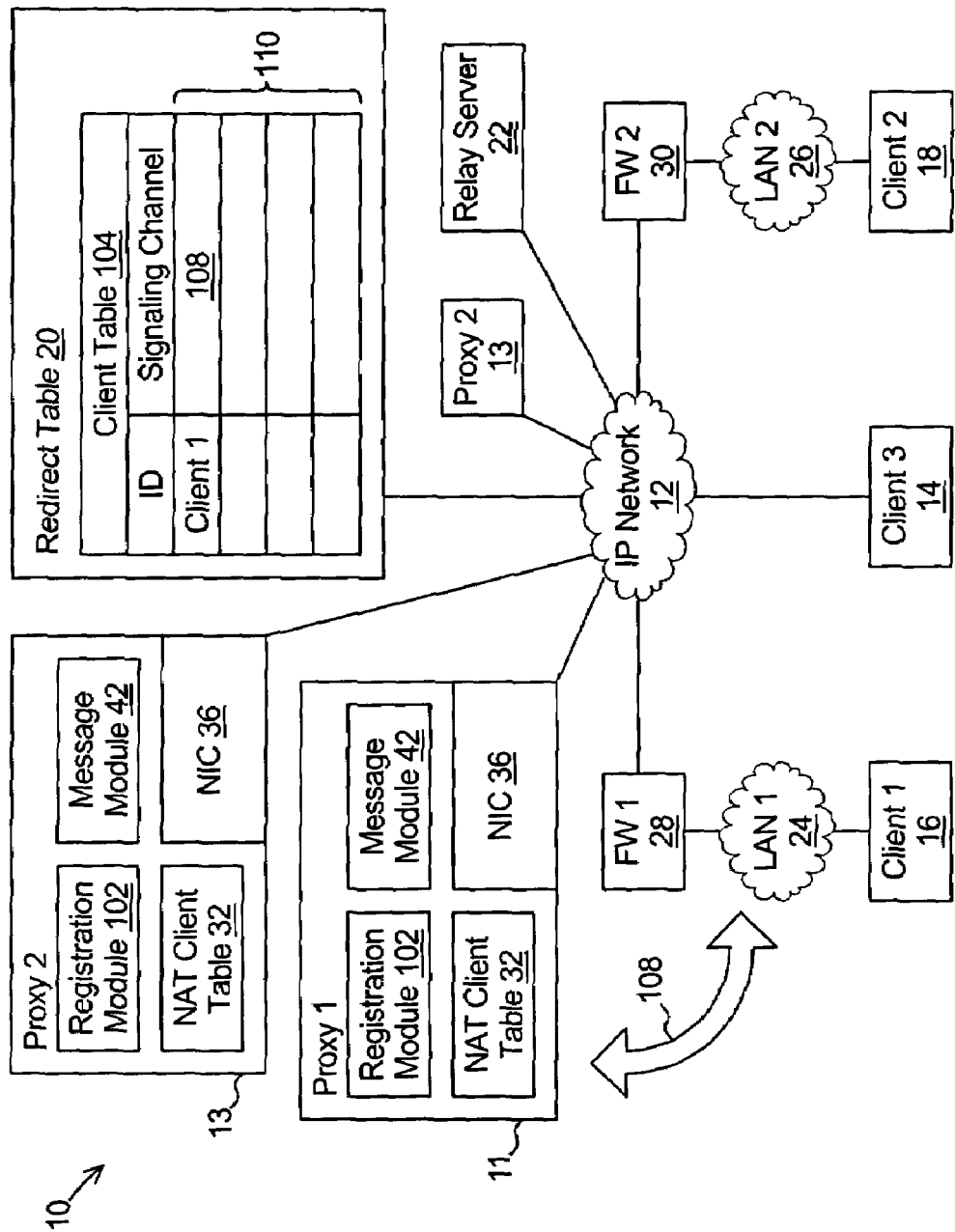
FIG. 1 is a block diagram of a real time media communication network in accordance with one embodiment of the present invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

Referring to FIG. 1, a block diagram a system 10 that supports at least one of real time audio and video communications is shown. The system 10 includes an internet protocol (IP) network 12 interconnecting a plurality of devices. Coupled to the network 12 are a redirect server 20, a relay server 22, at least one proxy server 11, a first NAT firewall 28, a second NAT firewall 30, and a third communications client 14.

Each of the network devices operates a suite of IP protocols that enable the device to set up TCP/IP logical connections and/or UDP/IP channels with other network devices over the network 12. Each device is assigned a public Internet Protocol (IP) address and communications between the various devices utilize IP channels defined by each devices IP address and a port number assigned to the IP channel.

The redirect server 20 may be a known "SIP Redirect Server" that provides a "SIP Moved Temporarily-302" message in response to receiving a "SIP Invite" message identifying a SIP user agent. More specifically, the redirect server 20 may maintain a client table 104 with a plurality of records 110. Each record 110 associates a client ID number with an IP signaling channel (IP address and port number) that may be used to signal the client. When the redirect server 20 receives an invite message identifying a client, the redirect server will look up the signaling channel for the identified client and return the looked up signaling channel in the "Moved Temporarily-302" redirect response message.

The first NAT firewall 28 may include a network address translation (NAT) server that operates as an IP layer proxy for a first client 16 that is coupled to the first NAT firewall 28 by a local area network 24. Similarly, the second NAT firewall 30 may include a NAT server that operates as an IP layer proxy for a second client 18 that is coupled to the second NAT firewall 30 by a local area network 26.

Each private network 24 and 26 may function in a similar manner to the network 12 using the IP protocols. However, the IP network address assigned to the first client 16 will be an address selected from a class of IP network addresses reserved for private networks (referred to as a private network address) and assigned to the first client 18 by a DHCP server associated with the private network 24. Similarly, the second client 18 will be assigned a private network address by a DHCP server associated with the second private network 26.

It should be appreciated that it is possible that both the first client 16 and the second client 18 will be assigned the same private network address (e.g. a private network address is not globally unique). As such, an IP frame with a destination address that is a private network address is routable only on the private network. An IP frame with a destination address that is globally unique address can be routed on the network 12. An IP frame with a destination address that is globally unique can also be routed on a private network 24 or 26, but will always be routed to the NAT firewall 28 or 30 respectively. The NAT firewall 28 or 30 operates as an IP layer proxy and establishes an IP channel on the internet for routing the frame on behalf of the private network device that sourced the frame.

More specifically, a NAT firewall (NAT firewall 28 will be used for purposes of discussion, but it should be understood that NAT firewall 30 may have the same structures and functions) performs both address translation and port translation on each frame that is routed to the NAT firewall 28 on the private network 24 and includes a destination address that is globally unique (e.g. an outbound frame).

To enable a device coupled to network 12 to reply to a translated frame, the NAT firewall 28 also performs reverse address translation and revere port translation of frames received over the network 12 (e.g. an inbound frame).

The NAT firewall 28 records the translation of each outbound frame in a record within a translation table. The translation table record associates the private network IP address and port number of the outbound frame to the globally unique IP address of the NAT server and a translation port number assigned by the NAT firewall 28. For added security, the translation table record may further include the destination network address and port number to which the outbound frame was addressed.

An inbound frame will include a destination address and port number. The destination address is the globally unique address of the of the NAT firewall 28. That is how the inbound frame was routed to the NAT firewall 28 over the network 12. The NAT firewall 28 will then locate the record within the translation table that includes a translation port number that is the same as the destination port number of the inbound frame. For security, the NAT firewall 28 will then verify that the source address and port number of the inbound frame matches the destination address and port number of the outbound frame. Provided there is a match, the NAT firewall 28 will reverse translate the inbound frame by replacing the destination address and port number with the source address and port number of the outbound frame.

As discussed, the NAT firewall 28 prevents a device coupled to network 12 from sending an IP frame to the first client 16 unless that IP frame is an inbound frame that is sent in response to an outbound frame originated by the first client.

Proxy Server and Relay Server

The proxy server 11 and the relay server 22, each include structure and function that, in combination: i) provide for call signaling messages to be sent to the first client 16 even though the first client 16 has a private network IP address and is coupled to the first local area network 24; and ii) enable an inbound UDP/IP channel to be established to the first client 16 for transport of real time audio or real time video to the first client even though the first client 16 has a private network IP address and is coupled to the first local area network 24.

The proxy server 13 has the same structure and function as the proxy server 11 and, the proxy server 13, in combination with the relay server 22: i) provides for call signaling messages to be sent to the second client 18; and ii) enables an inbound UDP/IP channel to be established to the second client 18 for transport of real time audio or real time video to the second client 18. A more detailed discussion of the structure and function of the proxy servers 11 and 13 and the relay server are included herein.

Signaling from behind Firewall to Global Client

Figure 2A:
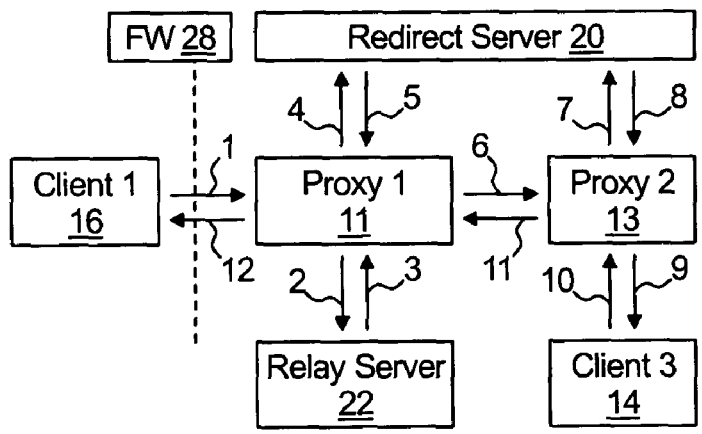
FIGS. 2a through 2c are block diagrams representing session signaling flow in accordance with one embodiment of the present invention.

FIG. 2a represents an overview of signaling for the first client 16 initiating an audio or video media session to the third client 14. As discussed, the first client 16 has a private network IP address and is supported by the NAT firewall 28 and the third client 14 has a globally routable IP address.

Referring to FIG. 2a in conjunction with FIG. 5a, session signaling begins with the first client 16 sending a session invite message 156 (FIG. 5a) to the first proxy server 11 as represented by signal "1" in FIG. 2a.

The session invite message 156 may be a SIP INVITE message that includes various SIP headers. The headers that are useful for illustrating the present invention are shown in an order useful for discussion. It should be appreciated that an actual session invite message 156 may include many additional headers and the order of such headers will be in accordance with the applicable protocols.

A session ID header 158 labels a unique session ID number generated by the first client 16. This unique session ID number will be included in a session ID header 158 of all future messaging relating to the session.

An invite header 160 labels an ID field 162, and IP address field 164, and a port number field 166. The ID number field 162 contains a unique ID number assigned to the ultimate destination of the message which, in this example, is the third client 14. The IP address field 164 contains the IP address to which the invite message is sent which, in this case is the IP address of the proxy server 11. The port number field 162 contains the port number on which the proxy server 11 receives signaling messages.

A plurality of via headers 168 label the path a message takes through one or more proxy servers. The single via header 168 of the session invite message 156 identifies the source of the session invite message 156 by labeling a type field 170, an address field 172, and a port number field 174. The type field 170 includes identification of the signaling protocol used, for example SIP 2.0 UDP. The address field 172 contains the IP address of the device originating the invite message. The port number field 174 contains the port number used for signaling by the device originating the invite message 156.

A contact header 176 labels an ID field 178, an IP address field 180, and a port number field 182 which in combination identify the first client 16. The ID field 187 includes the unique ID number assigned to the originator of the invite message (e.g. the first client 16). The IP address field 180 includes the IP address field of the first client 16 and the port number field 182 includes the port number on which the first client 16 receives signaling messages.

In addition to such headers, the invite message 156 will also include session description protocol (SDP) payload 184 which identifies the IP address 186 and either an audio port number 188, or a video port number 190, used by the first client 16 for real time protocol audio sessions or video sessions respectively.

It should be appreciated that because the first client 16 is behind a firewall, the IP address of the first client 16 as included in fields 172, 180, and 186 will be a private network address that is un-routable on the network 12.

Returning to FIG. 2a, after the first proxy server 11 receives the session invite message (Signal "1"), the proxy server 11 determines that the source of the session invite message (e.g. the first client 16) has a private network IP address. The methods for making such a determination are discussed herein. In response to making such a determination, the proxy server 11 must request a resource form the relay server 22.

The process of requesting a resource includes sending a relay server invite message 202 (FIG. 8*a*) to the relay server 22 as represented by signal "2" (FIG. 2*a*) and receiving a relay server response message 204 (FIG. 8*b*) back from the relay server as represented by signal "3" (FIG. 2*a*).

The relay server response message 204 identifies the IP address of the relay server 22 as well as an audio port number and/or a video port number. The port numbers may be used for opening an IP channel to the relay server 22 for the relay of audio or video media between two IP devices. Both such messages as well as operation of the relay server will be discussed in more detail.

A proxy server, such as the first proxy server 11, must forward each invite message that it receives to either its ultimate destination or to a proxy server serving the ultimate destination. To determine where to forward an invite message, the proxy server 11 queries the redirect server to receive a redirect address. More specifically, signal "4" represents sending a redirect invite message 214 (FIG. 7*a*) to the redirect server 20 and signal "5" represents receiving a redirect response 216 (FIG. 7*b*) back from the redirect server. The redirect response 216 will include a redirect address and port number to which the invite message should be forwarded.

Signal "6" represents sending a forwarding invite message 192 as shown in FIG. 5*b* to the second proxy server 13. The forwarding invite message 192 includes all of the information of the invite message 156 (FIG. 5*a*) except information that is changed by the first proxy server 11 in accordance with this invention.

More specifically, an additional via header 160*a* that includes the IP address and signaling port number of the proxy server 11 as added to the forwarding invite message 192; ii) a record route header 177 which also contains the proxy server 11 information is added to the forwarding invite message 192. As is known, the record route field provides for all further messages regarding the session to be routed through the proxy server 11.

Because the first client 16 has a private network IP address and the IP channel on which the session invite message 156 was sent to the first proxy server 11 underwent IP address translation and port translation by the NAT firewall 28, the NAT IP address and the NAT port number from the IP channel replace the private network IP address and port number in each of the contact header 176 and in the via header 168.

The relay server resource (e.g. the IP address 208 of the relay server and the port number 209 or port number 210 obtained in the relay server response message) replace the IP address and the audio port number or the video port number of the first client 16 in the SDP payload fields 184 of the forwarding invite message 192.

And, the redirect IP address and the redirect port number replace the IP address and the port number of the first proxy server 11 in the invite header 160 of the forwarding invite message 192.

After making these additions and replacements, the forwarding invite message 192 is sent to the second proxy server 13 as represented by Signal "6" of FIG. 2.

As previously discussed, each proxy server must forward each invite message that it receives to either its ultimate destination or to a proxy server serving the ultimate destination. As such, to determine where to forward the forwarding invite message 192, the second server 13 queries the redirect server 20 to receive a redirect address. More specifically, signal "7" represents the second proxy server 13 sending a redirect invite message to the redirect server 20 and signal "8" represents receiving a redirect response back from the redirect server. The redirect response will include a redirect address and port number to which the invite message should be forwarded. Because the third client 14 is supported by the second proxy server 13, the redirect address will the globally unique IP address of the third client 14 and the port number will be a port number on which the third client 14 receives signaling messages.

Signal "9" represents sending a second forwarding invite message 194 as is shown in FIG. 5C to the third client 14. The second forwarding invite message 194 will include all of the information of the forwarding invite message 192 (FIG. 5*b*) except information that is changed by the second proxy server 13. Specifically, second forwarding invite message will include an additional via header 168*b* identifying the second proxy server 13 and an invite header 160 that includes the redirect IP address (e.g. the globally unique IP address of the third client 14) and the redirect port number (e.g. the signaling port number of the third client 14) replacing the IP address and the port number of the second proxy server 13. After making these additions and replacements, the second forwarding invite message 194 is sent to the second proxy server 13 as represented by Signal "9" of FIG. 2.

After the third client 14 receives the invite message of signal "9", it may return various messages such as a SIP trying message and a SIP ringing message. When the third client 14 is ready to begin a media session, it will return an OK response message 230 as is shown in FIG. 6*a* back to IP address identified in the most recently added via header (via header 168*b* of the second forwarding invite message 194). The OK response message is represented by signal "10" in FIG. 2*a*.

The OK response message 230 will include at least the following headers copied from the second forwarding invite message 194: i) the Session ID header 158; i) all of the via headers 168, 168*a*, and 168*b*; ii) and the record route header 177. In addition, the OK response message 230 will include SDP payload that identifies the globally unique IP address of the third client 14 as well as an audio port number and/or a video port number assigned by the third client 14 for audio and/or video media respectively.

Signal "11" represents the second proxy server 13 returning a forwarding OK response message 232 to the first proxy server 11. The forwarding OK response message 232 will include all of the headers and the SDP payload of the forwarding OK response message 230 except that the via header 168*b* identifying the second proxy server 13 will have been removed.

Signal "12" represents the first proxy server 11 returning a second forwarding OK response message 234 to the first client 16. The second forwarding OK response message 234 will include all of the headers of the forwarding OK response message 232 except: i) the via header 168*a* identifying the first proxy server 11 will have been removed; and ii) the SDP payload representing the IP address and port numbers of the third client 14 will have been replaced with the relay resource (IP address and port numbers assigned by the relay server to the session).

Following the signaling discussed above, each of the first client 16 and the third client 14 establish an IP channel to the relay server resource. The relay server will "connect" the IP channels by forwarding first client media received from the first client 16 to the third client 14 and forwarding third client media received from the third client 14 to the first client 16. Because the IP channel for the media session between the first client 16 and the relay server 22 is initiated by the first client 16, the third client media relayed to the first client by the relay server 22 on the IP channel will be reverse translated by the NAT firewall 28 and will reach the first client 16.

Signaling from Global Client to Behind Firewall

Figure 2B:
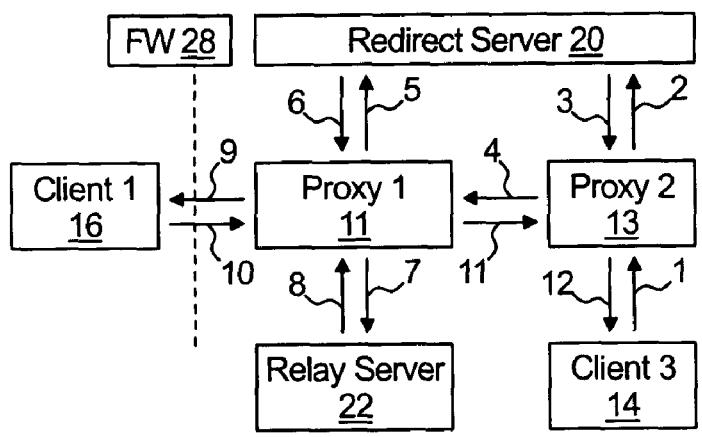

FIG. 2b represents an overview of signaling for the third client 14, with a globally unique IP address, initiating an audio or video media session to the first client 16 with a private network IP address and being supported by the NAT firewall 28.

Referring to FIG. 2b in conjunction with FIG. 5d, session signaling begins with the third client 14 sending a session invite message 236 to the second proxy server 13 as represented by signal "1" in FIG. 2b.

The session invite message 236 may be a SIP INVITE message that includes various SIP headers. A session ID header 158 labels a unique session ID number generated by the third client 14. This unique session ID number will be included in a session ID header 158 of all future messaging relating to the session.

An invite header 160 labels an ID field 162, and IP address field 164, and a port number field 166. The ID number field 162 contains a unique ID number assigned to the ultimate destination of the message which, in this example, is the first client 16. The IP address field 164 contains the IP address to which the invite message is sent which, in this case is the IP address of the second proxy server 13. The port number field 162 contains the port number on which the second proxy server 13 receives signaling messages.

Each of the via header 168 and the contact header 176 the session invite message 156 identifies the source of the session invite message 236 which, in this example is the third client 14.

In addition to such headers, the invite message 236 will also include session description protocol (SDP) payload 184 which identifies the IP address 238, an audio port number 240 and a video port number 242 used by the third client 14 for real time protocol audio sessions and video sessions respectively.

Returning to FIG. 2b, after the second proxy server 13 receives the session invite message 236 (Signal "1"), the second proxy server 13 determines that the source of the session invite message 236 (e.g. the third client 14) has a globally routable IP address. As such, the second proxy server 13 does not need to request a resource from the relay server 22.

The second proxy server 13 must forward each invite message that it receives to either its ultimate destination or to a proxy server serving the ultimate destination. To determine where to forward an invite message, the second proxy server 13 queries the redirect server 20 to receive a redirect address. More specifically, signal "2" represents sending a redirect invite message 214 (FIG. 7a) to the redirect server 20 and signal "3" represents receiving a redirect response 216 (FIG. 7b) back from the redirect server 20. The redirect response 216 will include a redirect address and port number to which the invite message should be forwarded.

Signal "4" represents sending a forwarding invite message 246 as shown in FIG. 5e to the first proxy server 11. The forwarding invite message 246 includes all of the information of the invite message 236 (FIG. 5d) except information that is changed by the second proxy server 13 in accordance with this invention.

More specifically: i) an additional via header 168a that includes the IP address and signaling port number of the second proxy server 13 as added to the forwarding invite message 236; ii) a record route header 177 which also contains the second proxy server 13 information is added to the forwarding invite message 236; and iii) the redirect IP address and the redirect port number replace the IP address and the port number of the second proxy server 13 in the invite header 160 of the forwarding invite message 246. After making these additions and replacements, the forwarding invite message 246 is sent to the first proxy server 11 as represented by Signal "4" of FIG. 2b.

As previously discussed, each proxy server must forward each invite message that it receives to either its ultimate destination or to a proxy server serving the ultimate destination. The message forwarded will be referred to as the second forwarding invite message 248 as shown in FIG. 5f.

To determine where to forward the second forwarding invite message 248, the first proxy server 11 queries the redirect server 20 to receive a redirect address. More specifically, signal "5" represents the first proxy server 11 sending a redirect invite message to the redirect server 20 and signal "6" represents receiving a redirect response back from the redirect server. The redirect response will include a redirect address and port number to which the invite message should be forwarded and the first proxy server 11 adds the redirect address and port number to the invite header of the second forwarding invite message 248.

Because the first client 16 is supported by the first proxy server 11 and because the first client 16 has a private network IP address, the redirect address will be the globally unique IP address of the NAT firewall 28 and the NAT port number that was used by the NAT firewall 28 to translate the post recent registration message sent by the first client 16 to the first proxy server 11.

The first proxy server 11 also adds itself to a new via header 168b, to the record route header 177.

Because the first client 16 has a private network IP address and is supported by the NAT firewall 28, the first proxy server 11 must request a resource from the relay server 22. Again, the process of requesting a resource includes sending a relay server invite message to the relay server 22 as represented by signal "7" (FIG. 2b) and receiving a relay server response message back from the relay server as represented by signal "8" (FIG. 2b).

The relay server response message will identify the IP address of the relay server 22 as well as an audio port number and/or a video port number. The port numbers may be used for opening an IP channel to the relay server 22 for the relay of audio or video media between two IP devices.

After receiving the resource from the relay server 22, the first proxy server 22 replaces the IP address and port numbers of the third client 14 in the SDP payload 184 with the IP address and resource port numbers of the relay server 22.

Signal "9" represents sending the second forwarding invite message 248 to the first client 16 in the IP channel open through the NAT firewall 28.

After the first client 16 receives the invite message of signal "9", it may return various messages such as a SIP trying message and a SIP ringing message. When the first client 16 is ready to begin a media session, it will return an OK response message 250 as is shown in FIG. 6d back to IP address identified in the most recently added via header (via header 168b of the second forwarding invite message 248). The OK response message is represented by signal "10" in FIG. 2b.

The OK response message 250 will include at least the following headers copied from the second forwarding invite message 248: i) the Session ID header 158; i) all of the via headers 168, 168a, and 168b; and ii) the record route header 177. In addition, the OK response message 230 may include SDP payload that identifies the private network IP address of the first client 16 as well as an audio port number and/or a video port number assigned by the first client 16 for audio and/or video media respectively. However, because the first client 16 has a private network IP address, this SDP payload is useless.

Signal "11" represents the first proxy server 11 returning a forwarding OK response message 252 as shown in FIG. 6e to the second proxy server 12. The forwarding OK response message 232 will include all of the headers of the OK response message 250 except that the via header 168b identifying the first proxy server 11 will have been removed. Additionally, because the first proxy server 11 obtained a resource of the relay server 22, the first proxy server 11 must includes the IP address and the resource ports of the relay server in the SDP payload of the forwarding response message 252.

Signal "12" represents the second proxy server 13 returning a second forwarding OK response message to the third client 14. The second forwarding OK response message will include all of the headers and the SDP payload of the forwarding OK response message 250 except that the via header 168a identifying the second proxy server 13 will have been removed.

Following the signaling discussed above, each of the third client 14 and the first client 16 establish an IP channel to the relay server resource. The relay server will "connect" the IP channels by forwarding first client media received from the third client 14 to the first client 16 and forwarding third client media received from the first client 16 to the third client 14. Because the IP channel for the media session between the first client 16 and the relay server 22 is initiated by the first client 16, the third client media relayed to the first client 16 by the relay server 22 on the IP channel will be reverse translated by the NAT firewall 28 and will reach the first client 16.

Signaling from behind Firewall to Client behind Firewall

Figure 2C:
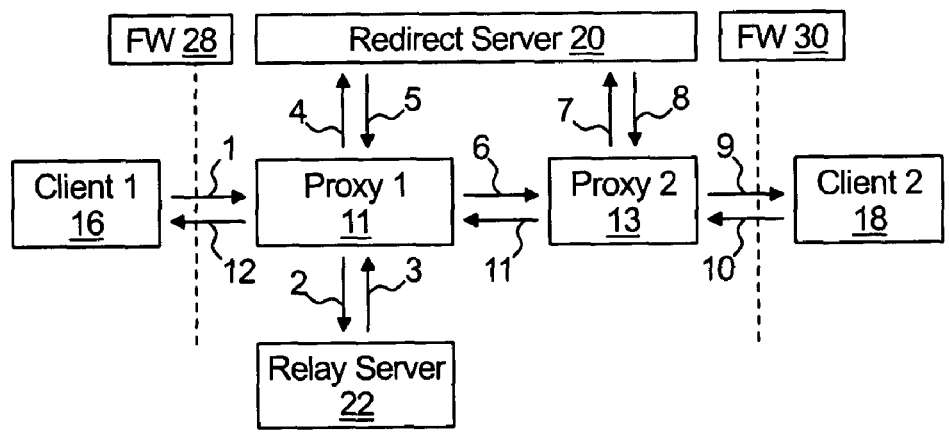

FIG. 2c represents an overview of signaling for the first client 16 initiating an audio or video media session to the second client 18. As discussed, the first client 16 has a private network IP address and is supported by the NAT firewall 28 and the second client 18 has private network IP address and is supported by the NAT firewall 30.

Referring to FIG. 2c the signaling steps "1" through "8" are all identical to the signaling steps discussed above with respect to FIG. 2a. To avoid redundancy, such steps and the associated messages will not be described again.

The redirect response (signal "8") to the second proxy server 13 will include a redirect address and port number to which the invite message should be forwarded. The second proxy server 13 adds the redirect address and port number to the invite header to build a second forwarding invite message 254 as is shown in FIG. 5g.

Because the second client 18 is supported by the second proxy server13 and because the second client 18 has a private network IP address, the redirect address will be the globally unique IP address of the NAT firewall 30 and the NAT port number that was used by the NAT firewall 30 to translate the most recent registration message sent by the second client 18 to the second proxy server13.

The second proxy server 13 also adds itself to a new via header 168b, to the record route header 177.

Even though the second client 18 has a private network IP address and is supported by the NAT firewall 30, a relay server resource has already been obtained, and is included in the SDP payload of the invite message. Therefore, the second proxy server 13 does not need to request a resource from the relay server 22. Signal "9" represents sending the second forwarding invite message 254 to the second client 18 in the IP channel open through the NAT firewall 28 as identified in the redirect response message.

After the second client 18 receives the invite message of signal "9", it may return various messages such as a SIP trying message and a SIP ringing message. When the second client 18 is ready to begin a media session, it will return an OK response message 256 as is shown in FIG. 6f back to IP address identified in the most recently added via header (via header 168b of the second forwarding invite message 254). The OK response message is represented by signal "10" in FIG. 2c.

There after, signals "11" and "12" are again the same (and the messages are again the same) as those discussed with respect to FIG. 2a.

Following the signaling discussed above, each of the first client 16 and the second client 18 establish an IP channel to the relay server resource. The relay server will "connect" the IP channels by forwarding first client media received from the first client 16 to the second client 18 and forwarding second client media received from the second client 18 to the first client 16. Because the IP channel for the media session between the first client 16 and the relay server 22 is initiated by the first client 16, the second client media relayed to the first client 16 by the relay server 22 on the IP channel will be reverse translated by the NAT firewall 28 and will reach the first client 16. Similarly, because the IP channel for the media session between the second client 19 and the relay server 22 is initiated by the second client 18, the first client media relayed to the second client 18 by the relay server on the IP channel will be reverse translated by the NAT firewall 30 and will reach the second client 18.

Proxy Server

Returning to FIG. 1, a proxy server that operates in accordance with the above description comprises a network interface module 36, a registration module 102, a messaging module 42, and a session table 32. For purposes of illustration the first proxy server 11 will be described herein. However, it should be understood that the second proxy server 13 has the same structure and function as the first proxy server 11.

The network interface module 36 couples the proxy server 11 to the IP network 12 and may comprise: i) a known combination of hardware circuits and software drivers for implementing the physical layer and data link layer networking functions of the OSI networking model; and known combination of software modules for implementing the TCP/IP protocols and the UDP/IP protocols of the network layer and transport layer of the OSI model.

The registration module 102 is responsible for assuring that the signaling channel 108 as stored in the client table 104 of the redirect server 20 is a channel on which the proxy server 11 may send signaling messages to the first client 16 through the NAT firewall 28. Operation of the registration module 102 is illustrated with reference to the flow chart of FIG. 3a and the registration message diagrams of FIG. 3b, in conjunction with FIGS. 1 and 2.

Figure 3A:
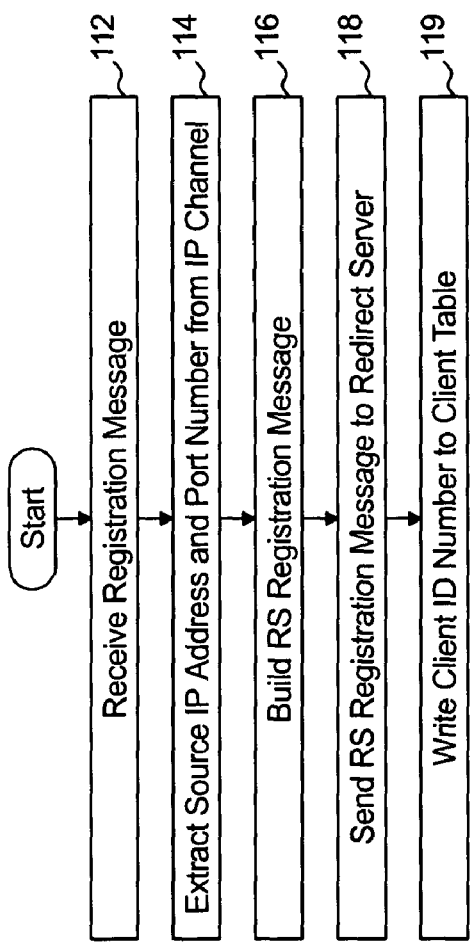
FIG. 3a is a flow chart representing exemplary operation of a registration module in accordance with the present invention.
Figure 3B:
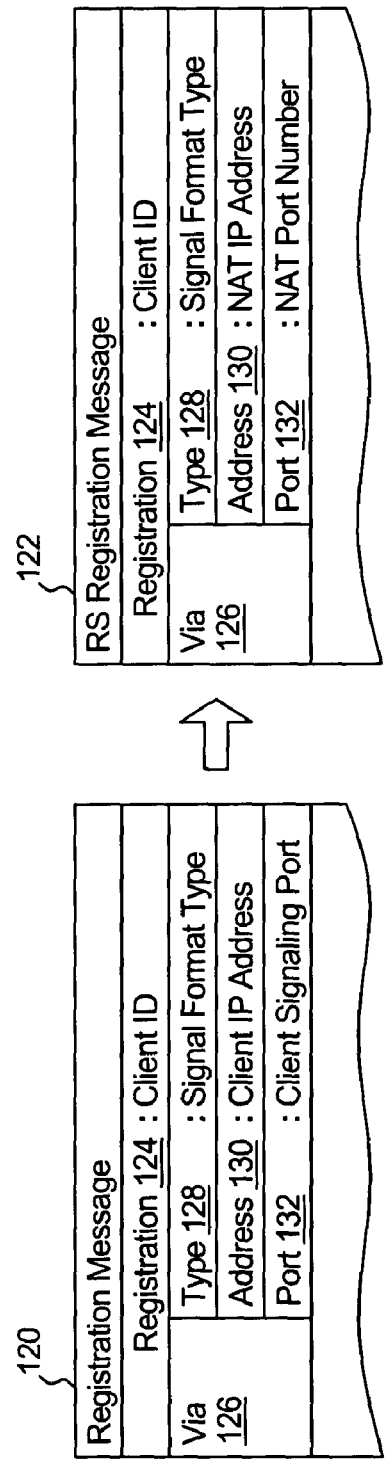
FIG. 3b is a diagram representing registration messages in accordance with one embodiment of the present invention.

Step 112 of the flowchart of FIG. 3a represents the registration module 102 receiving a registration message 120 from the first client 16 on the IP signaling channel 108.

The registration message 120 will include an identification field 124 which includes the globally unique ID of the first client 16. The registration message 120 will also include a contact header 176. Within the contact header 176 is an IP address field 180 which will include the private network IP address of the first client 16 and a signaling port number field 182 which will include a port number established by the first client 16 for receipt of signaling frames.

Step 114 represents the registration module 102 extracting the source network address and source port number from the IP signaling channel 108 on which the registration message 120 was received. This source network address will be the IP address of the NAT firewall 28 and the port number will be the NAT port number used by the NAT firewall 28 in translation the IP signaling channel 108 on which the registration message 120 was sent.

Step 116 represents the registration module 102 building a redirect server registration message 122. The redirect server registration message 122 includes the same fields as the registration message 120. However, the IP address of the NAT firewall 28 will replace the private network IP address of the first client 16 in the IP address field 180 and the port number used by the NAT firewall 28 will replace the port number established by the first client 16 in the signaling port number field 182.

Step 118 represents the registration module 102 sending the redirect server registration message 122 to the redirect server 20.

Step 119 represents writing the unique client ID number from the registration field 124 to the NAT client table 32 (FIG. 1). This enables the proxy server 11 to identify such client as a client with a private network IP address at a future time.

Returning to FIG. 1, the messaging module 42 is responsible for receiving and forwarding media session signaling messages. Operation of the messaging module 42 is illustrated with reference to the flow charts of FIG. 4a through FIG. 4d.

Figure 4A:
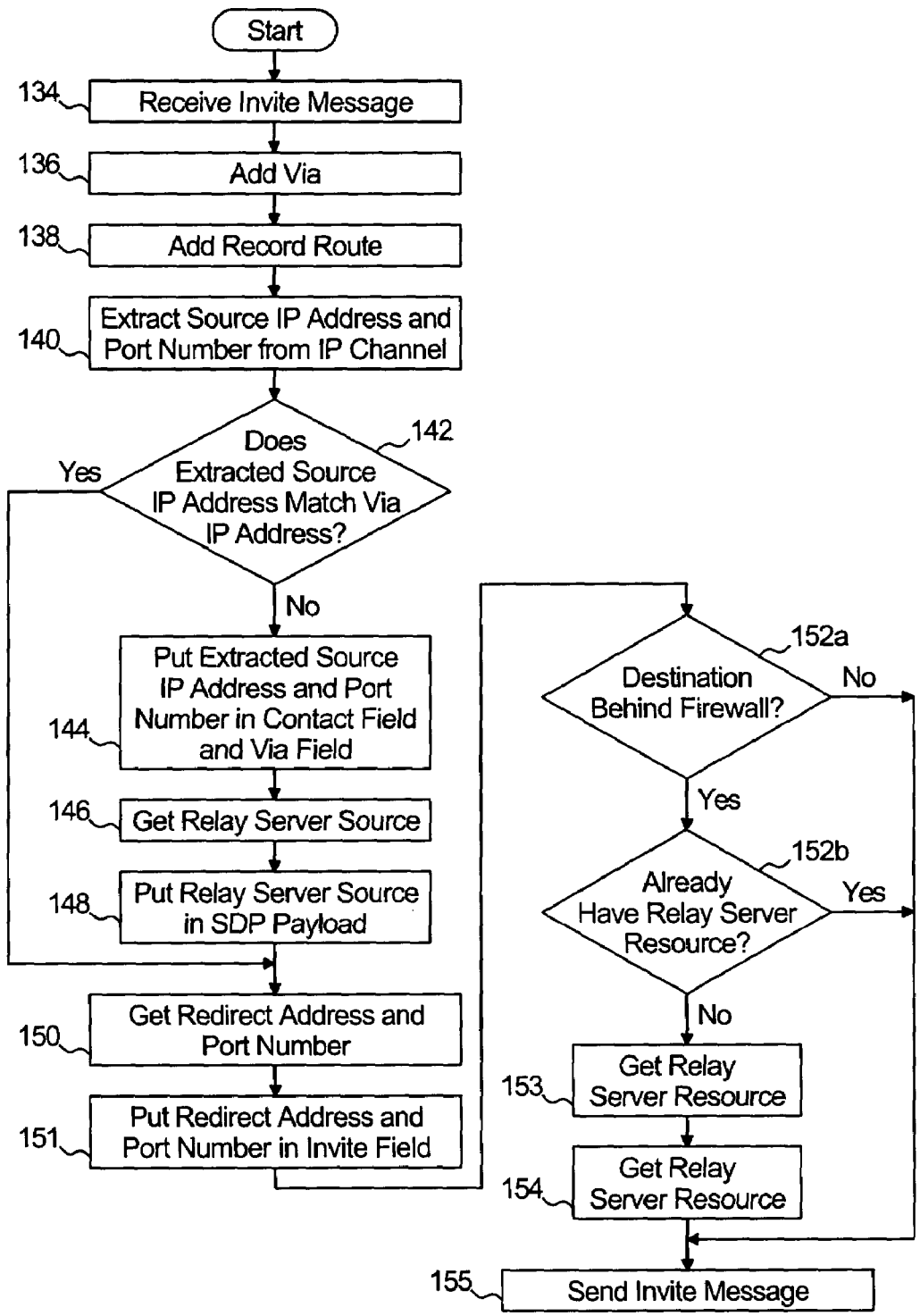
FIGS. 4a through 4d are flow charts representing exemplary operation of a proxy server in accordance with the present invention.

FIG. 4a represents processes performed by the messaging module 42 in response to receiving an invite message to signal a real time media communication session such as a SIP invite message. It should be appreciated that the steps shown in FIG. 4a provide for appropriate handling of any of the session invite messages or forwarding session invite messages as described with reference to FIG. 5a, 5b, 5d, or 5e.

Step 134 represents receiving the invite message. Because the proxy server 11 will never be the ultimate destination of an invite message, the proxy server 11 will need to build an invite message to forward to either a client or another proxy server. The invite message built to be forwarded will always include all of the information of the received invite message except as modified by the steps of the flowchart of FIG. 4.

Step 136 represents the proxy server 11 adding an additional via header 168a or 168b that includes the IP address and signaling port number of the proxy server 11.

Step 138 represents the proxy server 11 adding itself to an existing (or newly added) record route header 177.

Step 140 represents extracting a source IP address and port number from the IP channel on which the invite message was received and step 142 represents making a determination whether the extracted source IP address matches the IP address set forth in the most recent via header 168.

Because the first client 16 is behind the NAT firewall 28, the two IP addresses will not match when the first client 16 sends an invite message to the proxy server 11. However, the two IP addresses will mach if the invite message is sent by any device with a global IP address such as the third client 14 or the second proxy server 13.

If there is not a match, then steps 144-148 must be performed. Step 144 represents writing the extracted source address and the extracted source port number in both the contact header 176 and in the most recent via header 168.

Figure 4B:
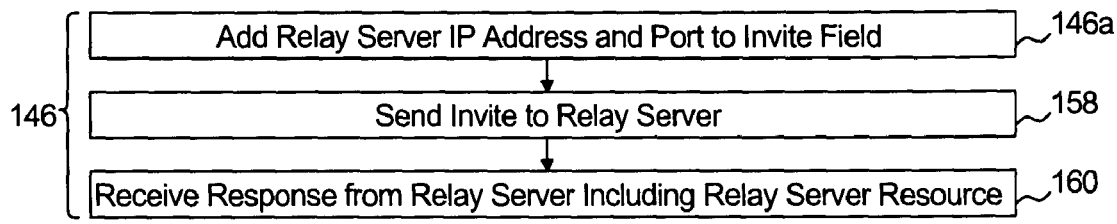

Step 146 represents getting a resource from the relay server 22. Referring briefly to FIG. 4b, the sub steps (of step 146) performed by the proxy server 11 to get a resource from the relay server 22 are shown. Getting the resource involves sending a relay server invite message 202 as is shown in FIG. 8a to the relay server 22 and receiving a relay server response message 204 back from the relay server 22 as is shown in FIG. 8b.

Step 144b represents building the relay server invite message 202 by putting the relay server IP address and signaling port number in place of the IP address and signaling port of the proxy server 11 in the invite header 160 of the received invite message. The other headers and the SDP payload remain as modified by the previous steps.

Step 148a represents sending the relay server invite message 202 to the relay server 22.

Step 148b represents receiving a relay server response message 204. The relay server response message may be a SIP compliant 302 redirect message. The response message 204 will include a session ID header 158 identifying the unique session ID number. The response message 204 will also include SDP payload 184 that identifies the relay server resource which is the IP address 208 of the relay server 22 and an audio port number 209 for relaying of audio media and a video port number 210 for relaying of video media.

Returning to the flow chart of FIG. 4, after obtaining the relay server resource at step 146, the proxy server 11 replaces the existing SDP payload 184 of the received invite message with the relay server resource (e.g. the IP address 208 of the relay server 22 and an audio port number 208 for relaying of audio media and a video port number 210 for relaying of video media replaces the IP address, audio port number, and video port number in the SDP payload 184 of the received invite message.

Step 150 represents the proxy server 11 getting the address and signaling port number of the destination to which the invite message is to be forwarded.

Figure 4C:
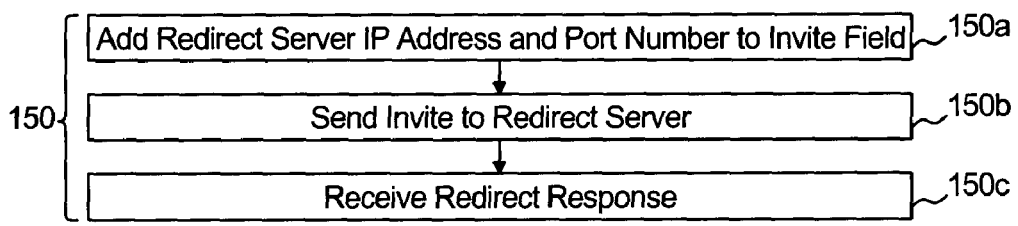
Figure 7A:
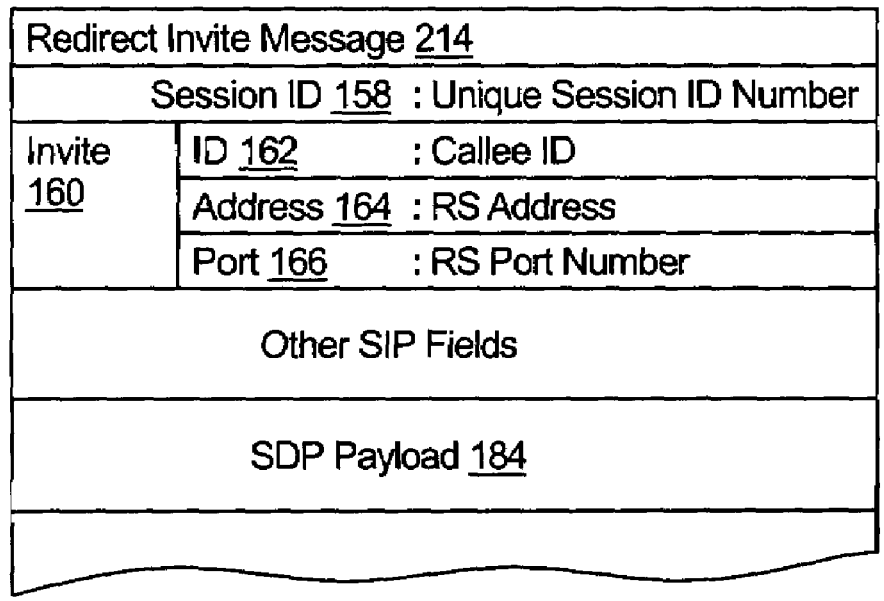
FIG. 7a represents an exemplary redirect invite message in accordance with the present invention.
Figure 7B:
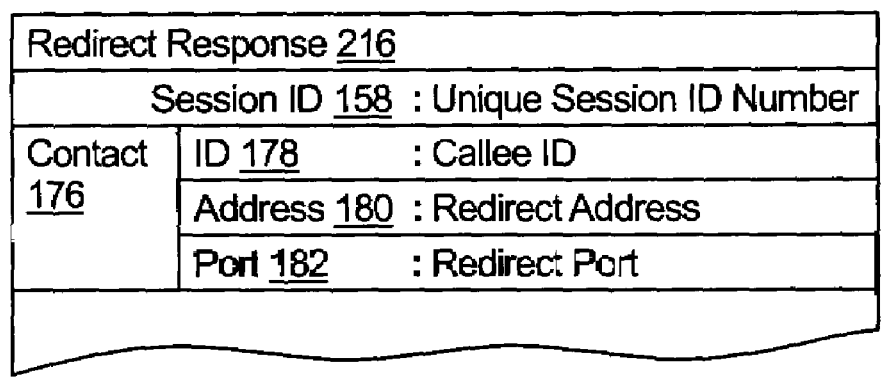
FIG. 7b represents an exemplary redirect response message in accordance with the present invention.

Referring briefly to FIG. 4c, the sub steps of step 150 are shown. Getting the address and signaling port number involves sending a redirect invite message 214 (as is shown in FIG. 7a) to the redirect server 20 and receiving a redirect response message 216 (as is shown in FIG. 7b) back from the redirect server 20.

Step 150a represents building the redirect invite message 214 by putting the IP address and signaling port number of the redirect server 20 in place of the IP address and signaling port of the proxy server 11 in the invite header 160. The other headers and SDP payload remain as modified during the previous steps.

Step 150b represents sending the redirect invite message 214 to the redirect server 20.

Step 150c represents receiving the redirect response message 216. The redirect response message 216 may be a SIP compliant 302 redirect message. The redirect response message 216 will include the session ID header 158 identifying the unique session ID number. The redirect response message 216 will also include the contact header 176 that labels the ID field 178, the IP address field 180, and the port number field 182. The ID field 178 will not be changed. However, the IP address field 180 and the port number field

182 will include a redirect IP address and a redirect port number to which the invite message is to be sent.

Returning to the flow chart of FIG. 4, following receipt of the redirect response message 216, the proxy server 11 puts (at step 151) the redirect IP address and the redirect port number in the IP address field 164 and the port number field 166 of the invite header 160.

Step 152*a* represents determining whether the destination to which the invite message is to be forwarded is behind a NAT firewall. The NAT client table 32 comprises a list of clients supported by the proxy server 11 that have a private network address and are supported by a NAT firewall. If the ID of the client in the ID number field 162 of the invite header 160 matches that of a client listed in the NAT client table 32, then the additional steps of 153 and 154 must be performed.

Provided however, if at step 152*b*, it is determined that a relay server resource has already been obtained, then steps 153 and 154 do not need to be performed.

Step 153 represents getting a relay server resource which comprises sub steps 146*a*-146*c* as previously discussed and step 154 represents replacing the SDP payload 184 of the received invite message with the relay server resource in a similar manner as described with respect to step 148.

Step 155 then represents forwarding the invite message as modified by the steps of the flow chart of FIG. 4*a* to the redirect IP address and the redirect port number.

Figure 4D:
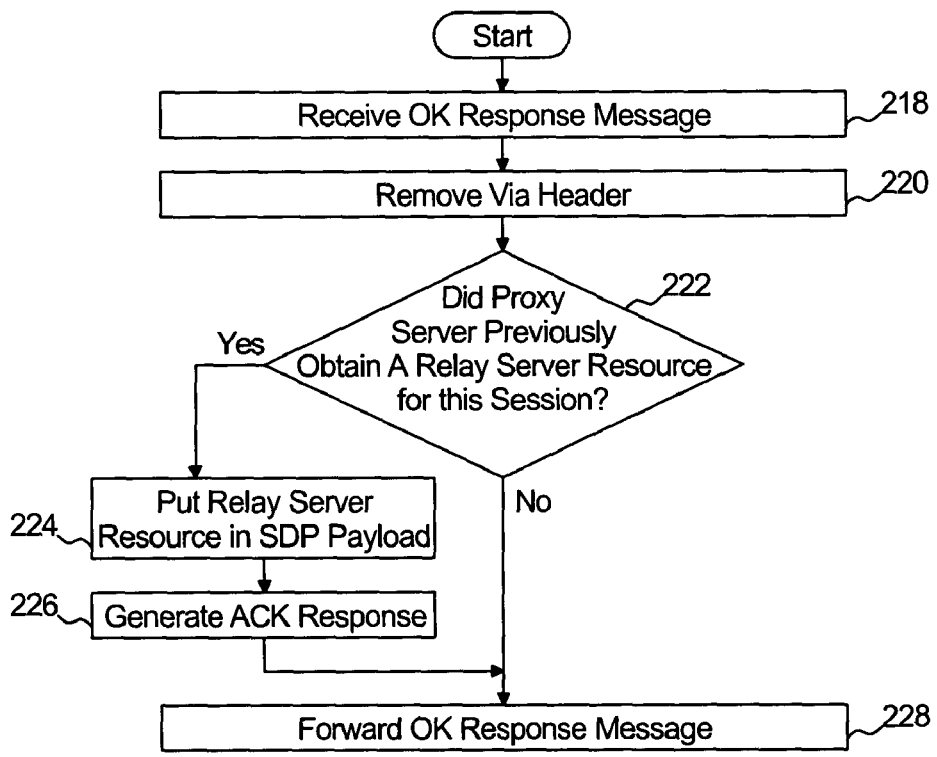

After the forwarding invite message 192 has been sent, eventually a response message such as a SIP 200 OK message will be received by the proxy server. The flow chart of FIG. 4*d* represents exemplary operation of the proxy server 11 when a response message. It should be appreciated that the steps shown in FIG. 4*d* provide for appropriate handling of any of the OK response messages or forwarding OK response messages as described with reference to FIG. 6*a*, 6*b*, 6*d*, or 6*e*.

Step 218 represents receiving the OK response message. Because the proxy server 11 will never be the ultimate destination of an OK response message, the proxy server 11 will need to build an OK response message to forward to either a client or another proxy server. The OK response message built to be forwarded will always include all of the information of the received OK response message except as modified by the steps of this flowchart of FIG. 4*d*.

Step 220 represents removing the top via header which includes the IP address and port number of the proxy server 11.

Step 222 represents making a determination whether the proxy server 11 previously obtained a relay server resource for this session. The may be done by comparing the session ID to records retained by the proxy server 11 in its NAT client table 32.

If the proxy server 11 did previously obtain a relay server resource for the session, the steps 224 and 226 must be performed. Step 224 represents replacing the SDP payload 184 of the OK response message with the relay server resource. The OK response message is then forwarded to the IP address and port number of the top via header (the next top via header after performing step 220) at step 228. Alternatively, if the proxy server 11 did not previously obtain a relay server resource for the session, the proxy server just forwards the OK response message to the to via header at step 228.

Relay Server

Figure 9:
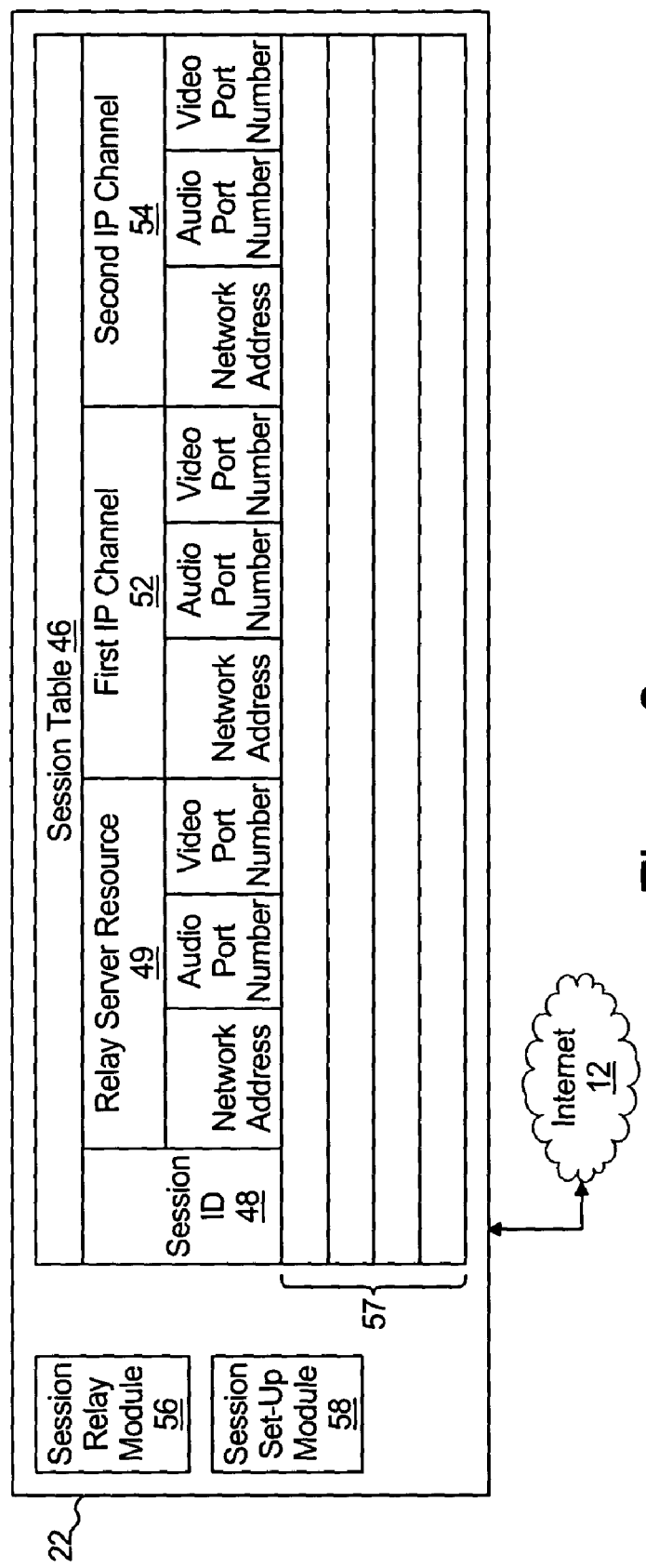
FIG. 9 is a block diagram representing an exemplary relay server in accordance with the present invention.

The block diagram of FIG. 9 represents the relay server 22. The relay server 22 may be embodied in typical server hardware for operating a session relay module 56, a session set up module 58, a session table 46, and various network interface circuits and IP service modules for communicating with other devices coupled to the network 12. It is envisioned that the structure of the relay server 22 and the redirect server 20 may be operating on two separate hardware systems. However, it is also envisioned that the relay server 22 and the redirect server 20 may be implemented on the same hardware system.

The session table 46 comprises a plurality of records 57. Each record 57 includes information to support a single audio or video media session being relayed through the relay server 22. Each record 57 comprises a session ID field 48 which identifies the session. The session ID field 48 may comprise the unique session ID number received by the session relay server 22 in the relay server invite message 202 (FIG. 8*a*). Associated with the session ID may be the relay server resource 49 assigned to the session as well as a first IP channel 52 and a second IP channel 54 between which the relay server 22 relays media.

Figure 10:
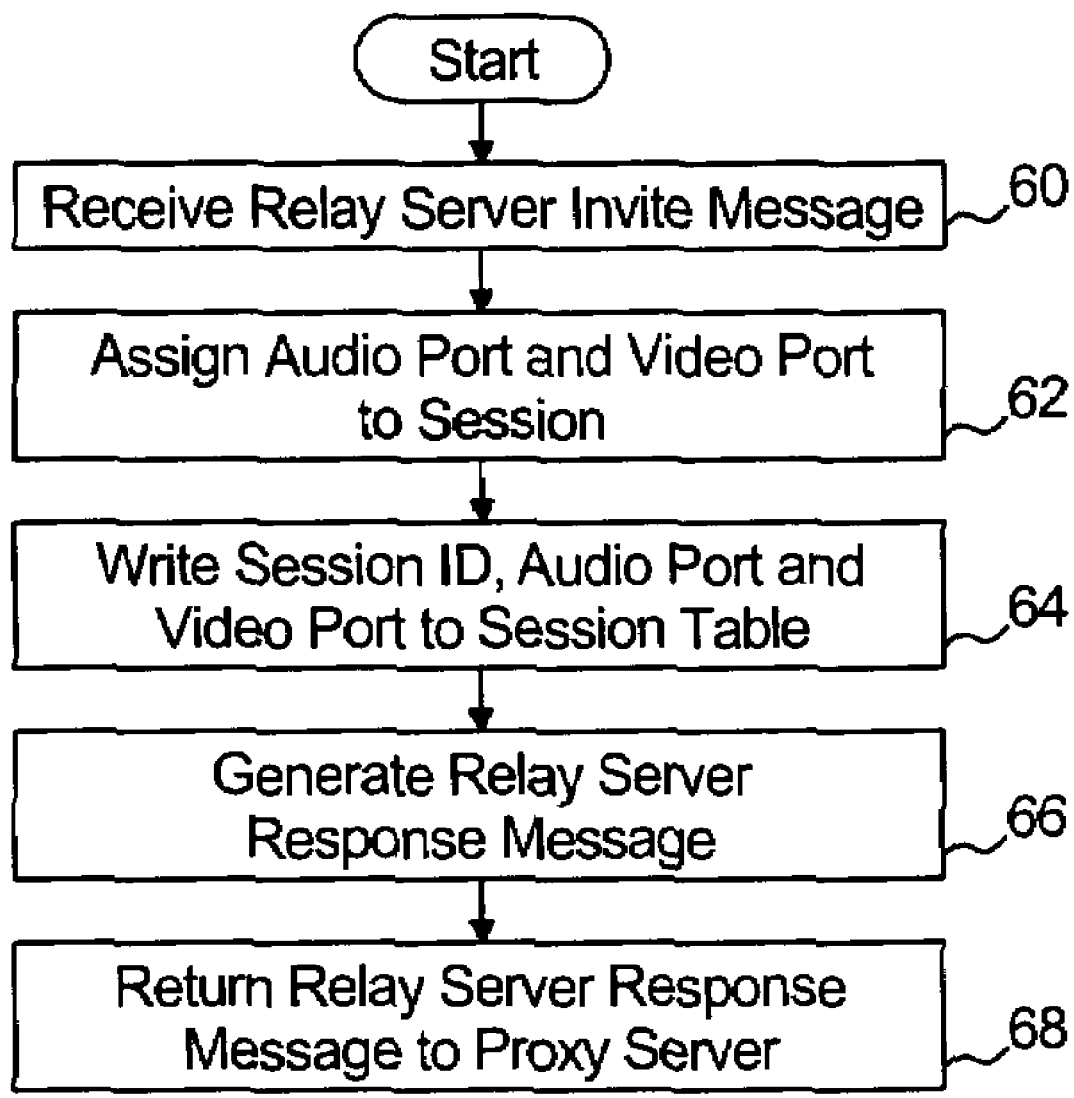
FIG. 10 is a flow chart representing exemplary operation of a session set up module in accordance with the present invention.

The session set up module 58 is responsible for receiving resource requests, assigning a relay server resource to each request, returning a relay server response message, and populating the session table 46. The operation of the session set up module 58 is represented by the flow chart of FIG. 10.

Step 60 represents receiving a relay server invite message sent to the relay server by a proxy server (for example the first proxy server 11).

Step 62 represents assigning an audio port number and/or, if applicable a video port number to the session.

Step 64 represents writing the session ID, the assigned port, and optionally the first IP channel (from the SDP payload of the relay server invite message 202) to a new record 57 in the session table 46.

Step 66 represents building the relay server response message 204 as shown in FIG. 8*b* and step 68 represents sending the relay server response message 204 to the proxy server that initiated the relay server invite message.

Returning to FIG. 9, at some point in time after the session set up module as assigned a resource to a session, the relay server may receive an OK message that includes SDP payload that identifies the IP address and port for the second IP channel 54. The session set up module further writes such IP channel to the applicable record of the session table 46.

Figure 11:
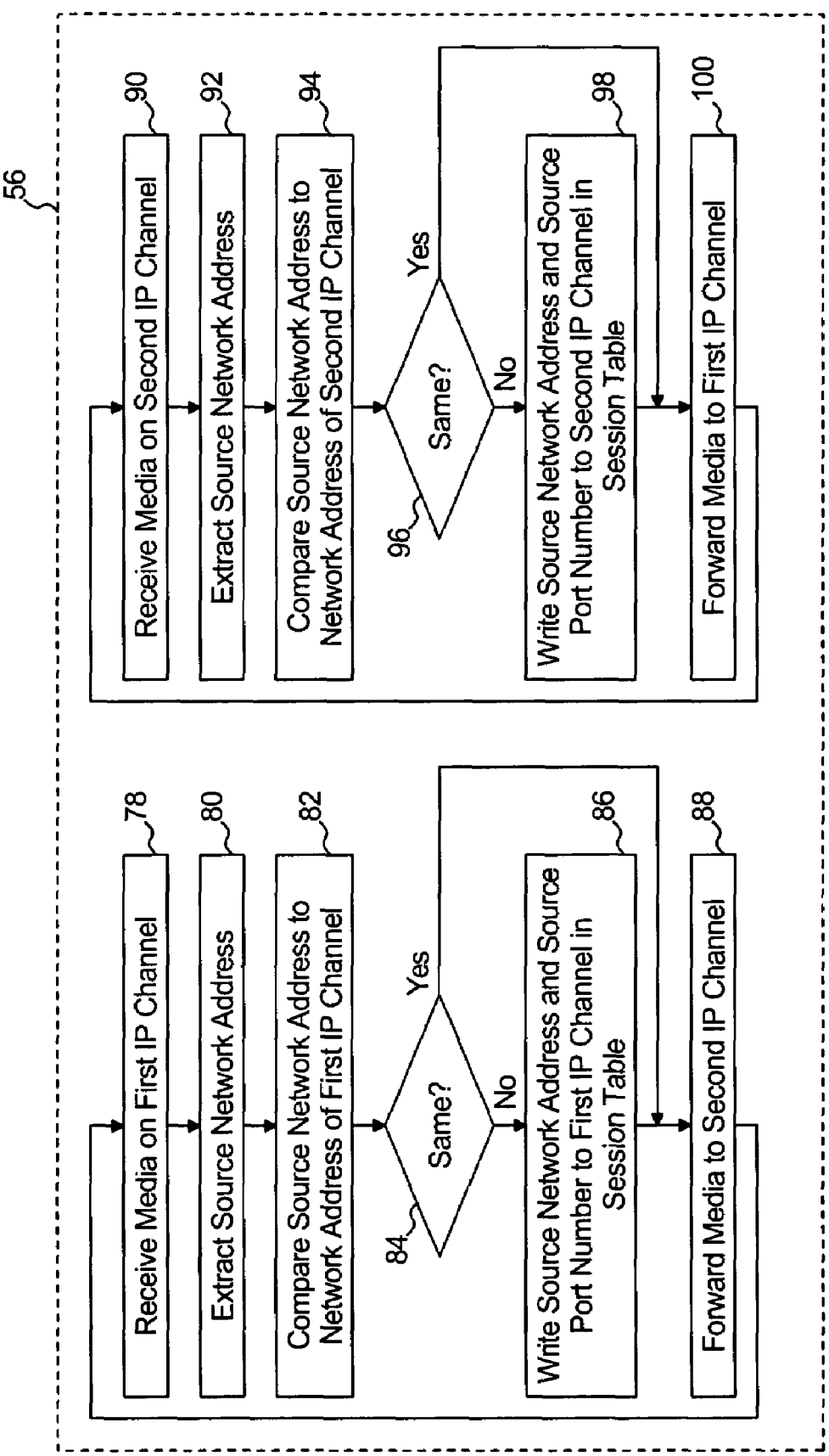
FIG. 11 is a flow chart representing exemplary operation of a session relay module in accordance with the present invention.

At some point in time thereafter, the relay server 22 will begin receiving media on both of the first IP channel 52 and the second IP channel 54. The session relay module 56 is responsible for relaying media received on the first IP channel 52 to the second IP channel 54 and relaying media received on the second IP channel 54 to the first IP channel 52. The flow chart of FIG. 11 shows exemplary operation of the session relay module 56.

Step 78 represents receiving first media on either the first IP channel 52 or the second IP channel 54.

Step 80 represents extracting the source network address from the received media and comparing the extracted source network address of the network address of the first IP channel 52.

If the two address match, then the media is forwarded on the second IP channel 54 at step 84. Alternatively, if the two addresses do not match, the extracted network address is compared to the network address of the second IP channel 54.

If the extracted address matches the network address of the second IP channel 54, then the media is forwarded on the first IP channel 52.

If the extracted network address does not match the network address of the first media channel 52 or the second media channel 54, then the extracted network address and an extracted port number are written to the session the session table 46 as either the first IP channel 52 or the second IP channel 54. The session relay module 56 alternates to which of the first IP channel 52 and the second IP channel 54 it will write the extracted IP address and port number.

In summary, it should be appreciated that the systems and methods provided enable media session signaling and media transfer between two clients even when one or more of the two clients have a private network IP address and are supported by a NAT firewall. Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A method of operating a proxy server for establishing a real time streaming media session between a first client served by the proxy server, the first client having been assigned an IP address which is a local area network address, and a second client served by a second proxy server, the method comprising:
   receiving an invite message from the first client over an internet protocol channel, the invite message including session description protocol fields identifying the IP address assigned to the first client and a unique identifier of the second client;
   comparing a source IP address extracted from the internet protocol channel to the IP address assigned to the first client;
   if the IP address extracted from the internet protocol channel does not match the IP address identified in the session description protocol fields, providing identification of a relay server resource to each of the first client and the second client by:
      sending a relay server invite message to a relay server;
      receiving a relay server response message, the relay server response message identifying a relay server resource, comprising a relay server IP address and port number, from a relay server;
      sending a redirect invite message to a redirect server, the redirect message including the identification of the second client;
      receiving a redirect server response message, the redirect server response message including a network address of the second proxy server serving the second client;
      sending a forwarding invite message to the network address of the second proxy server, the forwarding invite message comprising session description protocol fields identifying the relay server resource;
      receiving an OK response message from the second proxy server;
      sending, in response to receiving the OK response from the second proxy server, a second OK response to the first client, the second OK response comprising session description protocol fields identifying the relay server resource.

2. The method of claim 1, wherein the step of obtaining identification of a relay server resource comprises:
   providing a relay server resource request message to a relay server; and
   receiving a resource message from the relay server that includes identification of the relay server resource.

3. The method of claim 2, wherein:
   the relay server request message is a SIP invite message;
   the resource message is a SIP redirect message that includes a session description protocol payload that identifies the relay server resource.

4. The method of claim 1, wherein the step of providing the second OK response to the first client comprises including the session description protocol payload that identifies the relay server resource in a SIP OK message addressed to the IP address extracted from the internet protocol channel.

5. The method of claim 4, wherein the step of obtaining identification of a relay server resource comprises:
   providing a relay server resource request message to a relay server; and
   receiving a resource message from the relay server that includes identification of the relay server resource.

6. The method of claim 5, wherein:
   the relay server request message is a SIP invite message;
   the resource message is a SIP redirect message that includes a session description protocol payload that identifies the relay server resource.

7. The method of claim 1, further comprising:
   providing identification of the IP address of the first client to the second client if the IP address extracted from the internet protocol channel matches the IP address of the first client by:
   querying a redirect server to obtain a network address of the second proxy server serving the second client;
   sending a forwarding invite message to the network address of the second proxy server, the forwarding invite message identifying the IP address of the first client; and
   providing identification of an IP address of the second client to the first client by:
   receiving an OK response message from the second proxy server, the OK response message including identification of the IP address of the second client; and
   providing, in response to receiving the OK response from the second proxy server, a second OK response to the first client, the second OK response comprising identification of the IP address of the second client.

8. A proxy server for establishing a real time streaming media session between a first client served by the proxy server with a local area network address and a second client served by a second proxy server, the method comprising:
   a network interface for exchanging session messaging with remote devices over an internet protocol network;
   a session signaling module for receiving an invite message from the first client over a designated internet protocol channel, the invite message including identification of an IP address of the first client and a unique identifier of the second client;
   a comparison engine for comparing a source IP address extracted from the internet protocol channel to the IP address of the first client; and
   a messaging module for, if the IP address extracted from the internet protocol channel does not match the IP address of the first client:
   obtaining, from a relay server, identification of a relay server resource comprising a relay server IP address and port number; querying a redirect server to obtain a network address of the second proxy server serving the second client;

generating a forwarding invite message to the network address of the second proxy server, the forwarding invite message identifying client that the relay server resource; and generating, in response to receiving an OK response from the second proxy server, a second OK response message to the first client, the second OK response comprising identification of the relay server resource.

9. The proxy server of claim 8, wherein the messaging module obtains identification of a relay server resource by:

providing a relay server resource request message to a relay server; and receiving a resource message from the relay server that includes identification of the relay server resource.

10. The proxy server of claim 9, wherein:

the relay server request message is a SIP invite message;

the resource message is a SIP redirect message that includes a session description protocol payload that identifies the relay server resource.

11. The proxy server of claim 8, wherein the second OK response message to the first client is addressed to the IP address extracted from the internet protocol channel and comprises including the session description protocol payload that identifies the relay server resource.

12. The proxy server of claim 11, wherein the response message is a SIP OK message.

13. The proxy server of claim 11, wherein the invite message to the second client includes the session description protocol payload that identifies the relay server resource.

14. The proxy server of claim 8, wherein, if the IP address extracted from the internet protocol channel matches the IP address of the first client, the messaging module provides for:

querying a redirect server to obtain a network address of the second proxy server serving the second client;

sending a forwarding invite message to the network address of the second proxy server, the forwarding invite message identifying the IP address of the first client; and providing identification of an IP address of the second client to the first client by:

receiving an OK response message from the second proxy server, the OK response message including identification of the P address of the second client; and providing, in response to receiving the OK response from the second proxy server, a second OK response to the first client, the second OK response comprising identification of the IP address of the second client.

* * * * *